Figures 1A, 1B:
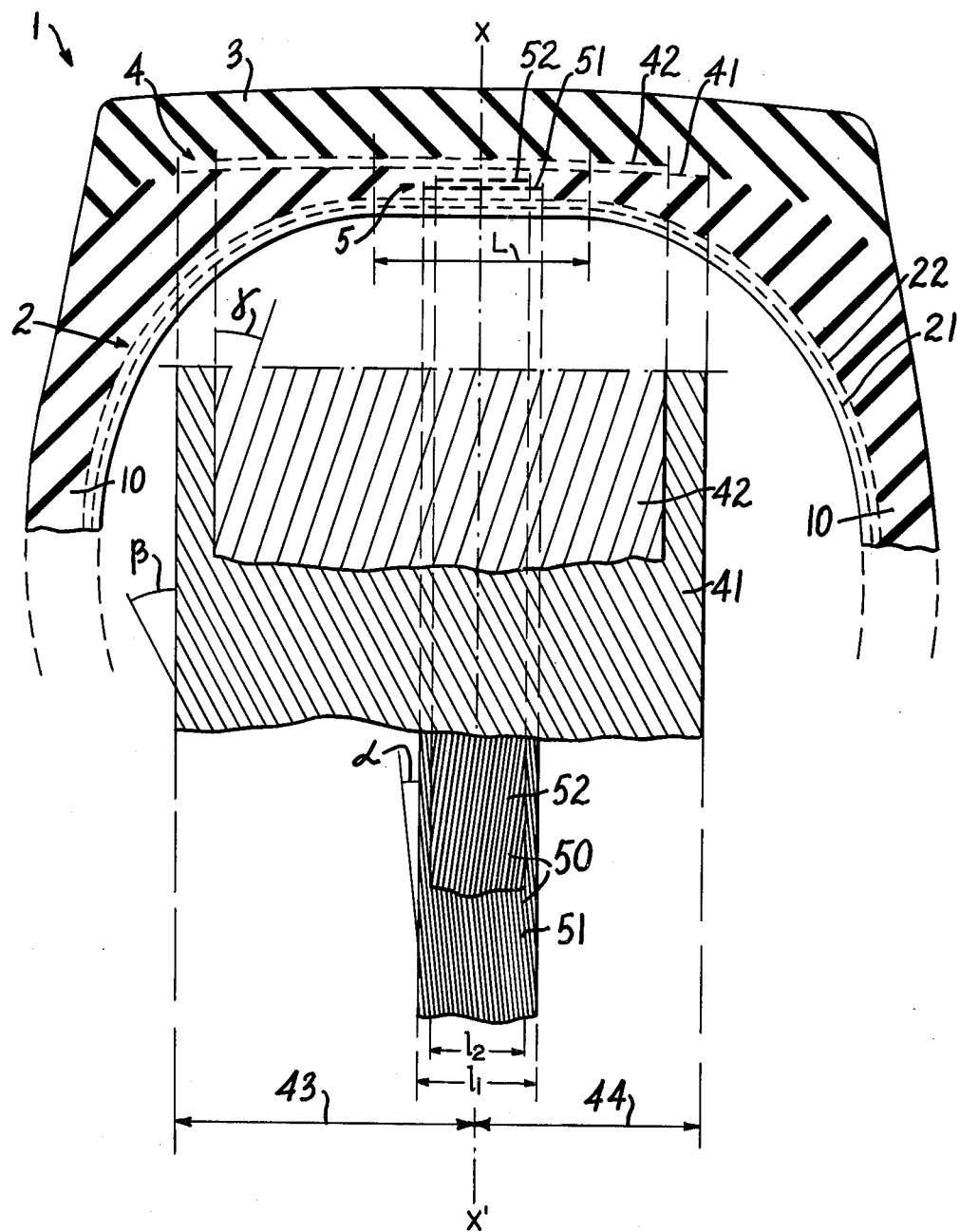

United States Patent [19]
Pommier

[11] 4,265,289
[45] May 5, 1981

[54] TIRE WITH ASYMMETRIC REINFORCEMENT EMPLOYING CARCASS EXPANSION CORRECTION BLOCK

[75] Inventor: Jean Pommier, Clermont-Ferrand, France

[73] Assignee: Compagnie Generale des Etablissements Michelin, Clermont-Ferrand, France

[21] Appl. No.: 117,030

[22] Filed: Jan. 30, 1980

Related U.S. Application Data

[63] Continuation-in-part of Ser. No. 19,181, Mar. 9, 1979, abandoned.

[30] Foreign Application Priority Data

Mar. 10, 1978 [FR] France ................................ 78 7387

[51] Int. Cl.³ ........................ B60C 11/10; B60C 9/20; B60C 9/08
[52] U.S. Cl. ........................... 152/209 A; 152/352 R; 152/354 R; 152/359; 152/361 FP; 152/361 DM
[58] Field of Search ........... 152/352 R, 352 A, 353 R, 152/354 R, 361 R, 361 FP, 361 DM, 359, 209

[56] References Cited

U.S. PATENT DOCUMENTS

| | | | |
|---|---|---|---|
| 2,884,040 | 4/1959 | Boussu et al. | 152/356 |
| 3,018,814 | 1/1962 | Saint-Paul | 152/361 FP |
| 3,515,197 | 6/1970 | Boileau | 152/361 R |
| 3,899,015 | 8/1975 | Gebert et al. | 152/361 FP |
| 4,016,916 | 4/1977 | Ravagnani | 152/361 R |
| 4,079,768 | 3/1978 | Verdier | 152/353 R |

FOREIGN PATENT DOCUMENTS

| | | | |
|---|---|---|---|
| 2280519 | 2/1976 | France | 152/361 R |
| 808824 | 2/1959 | United Kingdom | 152/361 R |

*Primary Examiner*—Caleb Weston
*Assistant Examiner*—Lois E. Boland
*Attorney, Agent, or Firm*—Brumbaugh, Graves, Donohue & Raymond

[57] ABSTRACT

A tire of the radial or crossing ply carcass type with an asymmetric tread reinforcement is improved due to the fact that a correction block is interposed between the assymetric tread reinforcement and the carcass reinforcement. This correction block consists of two plies of wires or cables which form with the longitudinal direction angles of opposite sign, each both other than zero and less than one-third of the smallest angle used in the asymmetric tread reinforcement. The correction block is preferably centered on the equatorial plane of the tire.

16 Claims, 4 Drawing Figures

TIRE WITH ASYMMETRIC REINFORCEMENT EMPLOYING CARCASS EXPANSION CORRECTION BLOCK

This application is a continuation-in-part application of U.S. application Ser. No. 19,181, filed Mar. 9, 1979, now abandoned.

The present invention relates to improvements in tires, essentially for heavy and very heavy vehicles chiefly used off the road, with preferably a radial carcass reinforcement anchored on both sides to at least one bead ring and with a tread reinforcement of slight meridian curvature formed of at least two superimposed plies of wires or cables which are parallel to each other in each ply and crossed from one ply to the other and form angles at most equal to 45° with the longitudinal direction of the tire, the tread reinforcement being asymmetrical, seen in radial section, with respect to the equatorial plane.

In order to remedy the edge separation between tread reinforcement plies, French Pat. No. 2,280,519, which corresponds to U.S. Pat. No. 4,079,768, contemplates, by way of example of such tires, the use of a tread axially protruding, on one side of the tire, from that surface of the tread which is intended to come into contact with the ground. This protrusion is to be mounted on the side of the tire on the inside of the vehicle, this side being more sensitive than the other to the defect of separation between plies. The side of the tire which is on the outside of the vehicle is more exposed to injuries coming from external objects when traveling off the road.

It has been found, however, that such an asymmetry of the tread reinforcement produces an asymmetry of the meridian profile of the carcass reinforcement and therefore of the tire as a whole mounted on a rim, inflated but not under load, as compared with the equatorial (median) plane of symmetry of the beads, particularly in the case of the use of a radial carcass reinforcement which is by nature very flexible.

It results from this that the advantage obtained by the asymmetry of the tread reinforcement is at least partially counteracted by the asymmetry assumed by the carcass reinforcement.

As a matter of fact, the lateral inclination of the crown causes a tilting of the carcass reinforcement on the side opposite the said protrusion.

This tilting causes a stressing of the tread reinforcement and therefore shear stresses between the plies forming it. These asymmetric stresses are superimposed on the stresses due to travel.

The object of the present invention is not only to reestablish the symmetry of the meridian profile of the carcass reinforcement with respect to the equatorial plane of the beads but also to eliminate the reaction on the tread reinforcement of the carcass reinforcement which tends to modify its equilibrium profile under the influence of the inflation pressure.

The present invention, which applies to tires of the type described above, is characterized by the fact that it provides in the equatorial zone along which the tread reinforcement is parallel to the carcass reinforcement (considered symmetrical with respect to the equatorial plane) and between these two reinforcements, a correction block formed of two superimposed plies of wires or cables of low extensibility which are parallel to each other in each ply and crossed from one ply to the other forming with the longitudinal direction angles of opposite sign, each being both other than zero and less in absolute value than one-third of the smallest angle used in the tread reinforcement, and preferably between 5° and 10°; the correction block being parallel to the carcass reinforcement, preferably centered on the equatorial plane and of a width less than the width of the equatorial zone along which the tread reinforcement is parallel to the carcass reinforcement. By equatorial zone there is understood a zone centered on the equator.

The correction block in accordance with the invention takes up the deformation forces which the carcass reinforcement, in tires of the type under consideration, transmits to the tread reinforcement, in particular in the equatorial zone where these two reinforcements are parallel. The carcass reinforcement thus retains a symmetrical meridian profile with respect to the equatorial plane, despite the asymmetry of the tread reinforcement. The invention thus makes it possible to retain the benefit due to this asymmetry. At the same time it removes the entire tread reinforcement from the harmful stresses coming from the inflation of the tire.

By wires or cables of low extensibility there are understood wires or cables, preferably metallic, for instance of steel, having a relative elongation $\Delta l/l$ less than 0.2% under a load equal to 10% of their rupture load. These cables can be produced with a high cable lay which is between 12 and 20 times the apparent diameter of the cable. These wires or cables are preferably arranged contiguous to each other.

In order to screen off as well as possible the transmission of tensions coming from the pressure of the carcass reinforcement and taking into account the fact that no ply reinforcement element, even of steel or of glass fibers, is inextensible in actual practice, the invention provides for arranging the reinforcement elements of the plies of the correction block at an angle other than zero with respect to the longitudinal direction. The crossed plies have in fact a tendency to decrease the meridian curvature of the correction block under the effect of an internal pressure. This curvature is a function of the obliqueness of the wires or cables of the correction block.

In order to retain the properties of the tread reinforcement it is important that the width of the correction block be between 60% and less than 100% of the width of the equatorial zone along which the tread reinforcement is parallel to the carcass reinforcement. With a carcass reinforcement essentially formed of symmetrically crossing plies, it is sufficient to impart to the correction block a width of between 5% and 20% of the maximum axial width of the carcass reinforcement, and preferably between 8% and 15%.

With a radial carcass reinforcement it is preferable that the correction block cover an equatorial zone of between 5% and 80% of the maximum axial width of the carcass reinforcement and more particularly between 12% and 20% for a ratio H/B close to 1, between 24% and 40% for a ratio H/B close to 0.75, and between 45% and 80% for a ratio H/B close to 0.3, H being the radial height of the tire on its rim and B the maximum axial width of the tire.

One of the plies of the correction block may be narrower than the other ply, the difference in width being at most equal to 10% of the width of the widest ply.

Figure 2:
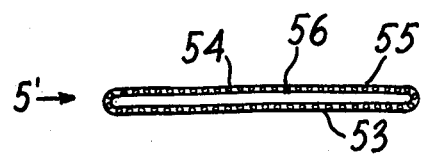
Figure 3:
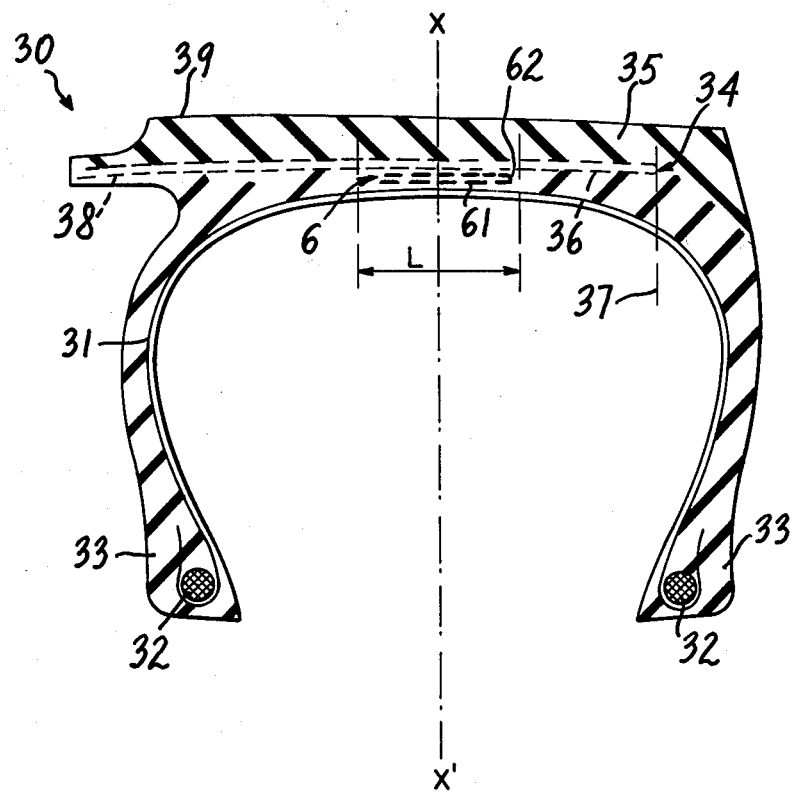

One embodiment of the invention described below with reference to the drawing shows an application of the invention to a radial carcass reinforcement, in view of the sensitivity of such a reinforcement to the presence of asymmetry. Another example applies to a carcass reinforcement formed of oblique crossing plies. In the drawing FIG. 1A shows the crown of a crossing carcass tire, seen in radial section, alongside of which in FIG. 1B is a plan view of the plies, essential for an understanding of the invention, and FIG. 2 is a radial sectional view through a variant embodiment of the correction block shown in FIG. 1A, and FIG. 3 is a radial sectional view through a radial carcass tire whose tread reinforcement protrudes axially from the tread.

The tire 1, only the crown of which is shown in FIG. 1A, comprises a carcass reinforcement 2 formed of two plies 21, 22 which are superimposed and symmetrically crossing with respect to the equatorial plane of the trace X—X' on the plane of the drawing. The two plies 21, 22 are represented in dashed lines to show that they are oblique. The equatorial plane of trace X—X' is also the median plane of the beads (not shown), which, in manner known per se, terminate the sidewalls 10 of the tire 1 and in each of which there is a bead ring around which the two plies 21, 22 are turned upward as customary. The tire 1 furthermore has a tread 3 provided with a tread reinforcement 4 formed of two plies 41, 42 which are crossed and composed of wires or cables. This tread reinforcement 4 is parallel to the carcass reinforcement 2 along an equatorial zone of width L; beyond this it has a meridian curvature which is less than that of the carcass reinforcement 2. The asymmetry of the tread reinforcement 4 consists in this example in the fact that the portions 43 and 44 of this tread reinforcement 4 which are located on opposite sides of the equatorial plane of trace X—X' are of different width. The correction block 5 is accordance with the invention is centered on the equatorial plane of trace X—X'; it is arranged between the carcass reinforcement 2 and the tread reinforcement 4, parallel to the carcass reinforcement 2, and its width $l_1$ is less than the width L of the equatorial zone along which the tread reinforcement 4 is parallel to the carcass reinforcement 2. The correction block 5 is formed of two plies 51 and 52. The ply 51 of width $l_1$ is wider than the radially outer ply 52 (width $l_2$). The angle $\alpha$ of the wires or cables forming the plies 51, 52 of the correction block 5 is less than one-third (e.g., less than one-quarter) of the angle $\gamma$ of the ply 42 of the tread reinforcement 4, the angle $\gamma$ being in its turn smaller than the angle $\beta$ which the ply 41 forms with the longitudinal direction of the tire 1, which direction is parallel to the trace X—X' of the equatorial plane.

For clarity of the drawing, the wires or cables of the tread reinforcement 4 are represented in the plan view (FIG. 1B) adjacent the radial section (FIG. 1A), by straight lines which are spaced widely apart from each other. The wires or cables 50 of low extensibility of the correction block 5 are represented by lines which are closer together to indicate that they are preferably arranged contiguous to each other.

The tension T per unit of width measured in the axial direction exerted on a ply by the carcass reinforcement can be evaluated in first approximation by means of the formula $T = p \cdot R / 2 \cos^2 \alpha$. In this formula, p is the inflation pressure of the tire, R is the radius of the ply with respect to the axis of rotation of the tire and $\alpha$ is the angle of the cables of the ply with the longitudinal direction. This formula indicates why the invention contemplates use in the correction block of angles $\alpha$ less than one-third of the smallest angle adopted for the tread reinforcement. Thus the tension T of a ply of the correction block is always less than the tension of the ply having the smallest angle in the tread reinforcement. The elongation of the correction block under the effect of the tension coming from the carcass reinforcement is thus less. This avoids transmitting this tension to the tread reinforcement.

FIG. 2 shows a correction block 5' formed of a single ply 53 whose edges 54 and 55 are folded so as to connect with each other along a parallel circle, such as 56.

The tire 30 of FIG. 3 has a radial carcass reinforcement 31 formed of a ply of steel cables which is turned up on both sides around a bead ring 32 in each bead 33. This carcass reinforcement 31 is represented by a continuous line to show that it is radial.

The tread reinforcement 34 of the tread 35 has a ply 36 of steel cables which is folded along a parallel circle 37 located opposite—referred to the equatorial plane of trace X—X'—the portion 38 of the tread reinforcement 34 which protrudes axially from the surface 39 of the tread 35. The radial carcass reinforcement 31 and the tread reinforcement 34 are parallel to each other along an equatorial zone of width L. The tread reinforcement 34 has a small meridian curvature which is less than that of the radial carcass reinforcement 31.

The correction block 6 in accordance with the invention is located and dimensioned in the same manner as that shown in FIG. 1A, but in this case it is formed of a ply 61 which is folded on itself. The folded edge 62 is arranged on the same side of the equatorial plane X—X' as the folded edge of the tread reinforcement 34.

Although in the foregoing and in the claims which follow reference is made to the smallest angle used for the plies of the tread reinforcement with respect to the longitudinal direction, the invention applies just as well in the case where the plies in question form equal angles (in absolute value) with said direction, so that the angle which the wires or cables of the correction block form with the longitudinal direction must be smaller than the angle (and not the smallest angle) of the plies of the tread reinforcement.

It is also useful to employ a correction block 5 consisting of two crossed plies 51, 52, the wires or cables 50 of which make different angles $\alpha$ in absolute value while remaining of opposite sign. The advantage of such asymmetrical arrangement is to correct, if necessary, lateral (axial) non-uniformity thrusts induced by the tread reinforcement 4, or to prevent, especially in cases where a relatively wide correction block 5 is used, the generation of such nonuniformity thrusts by the correction block 5 itself. These thrusts may disturb the vehicle behavior and cause uneven wear of the tread 3.

In fact, a correction block 5 formed by two symmetrically disposed plies 51, 52 (e.g., at angles $+\alpha$ and $-\alpha$) basically generates such harmful thrusts, because the two plies 51, 52 are not located at the same distance from the axis of rotation of the tire 1. Consequently, a correction block 5 which does not generate lateral thrusts has its wires or cables 50 disposed at asymmetrical angles $\alpha$. By preference, the correction blockply 51, the wires or cables 50 of which are oriented at the greater angle should be disposed radially inside the other ply 52. A satisfactory angular arrangement is thus 8° for the radially inner ply 51 and 3° for the radially outer ply 52.

What is claimed is:

1. A tire with a carcass reinforcement anchored on both sides to at least one bead ring and with a tread reinforcement which has a slight meridian curvature, which is asymmetrical with respect to the equatorial plane, which is parallel to the carcass reinforcement along an equatorial zone and which is formed of at least two superimposed plies of wires or cables that are parallel to each other in each ply and crossed from one ply to the other forming angles at most equal to 45° with the longitudinal direction of the tire, characterized by the fact that between the carcass reinforcement and the tread reinforcement there is arranged a correction block formed of two superimposed plies of wires or cables of low extensibility which are parallel to each other in each ply and crossed from one ply to the other forming with the longitudinal direction angles of opposite sign, each being both other than zero and less in absolute value than one-third of the smallest angle used in the tread reinforcement; the correction block being parallel to the carcass reinforcement, preferably centered on the equatorial plane and of a width less than the width of the equatorial zone along which the tread reinforcement is parallel to the carcass reinforcement and further characterized by the fact that the wires or cables of low extensibility of the correction block have a relative elongation less than 0.2% under a load equal to 10% of their rupture load.

2. The tire according to claim 1, characterized by the fact that the opposite angles formed by the wires or cables of the two plies of the correction block are asymmetrical with the longitudinal direction of the tire.

3. The tire according to claim 2, characterized by the fact that the wires or cables of the radially inner ply of the correction block form a greater angle than that of the wires or cables of the radially outer ply of the correction block.

4. The tire according to claim 3, characterized by the fact that the angle of the wires or cables of the radially inner ply is 8° and the angle of the wires or cables of the radially outer ply is 3° in absolute value.

5. The tire according to claim 1, characterized by the fact that the opposite angles formed by the wires or cables of the two plies of the correction block are symmetrical with the longitudinal direction of the tire.

6. The tire according to claim 2 or claim 5, characterized by the fact that the width of the correction block is between 60% and less than 100% of the width of the equatorial zone along which the tread reinforcement is parallel to the carcass reinforcement.

7. The tire according to claim 2 or claim 5, characterized by the fact that the carcass reinforcement is essentially formed of symmetrically crossing plies.

8. The tire according to claim 2 or claim 5, characterized by the fact that the carcass reinforcement is essentially radial and, preferably, essentially formed of a single ply of steel cables.

9. The tire according to claim 5, characterized by the fact that the opposite symmetrical angles formed by the wires or cables of the two plies of the correction block are between 5° and 10° in absolute value.

10. The tire according to claim 2 or claim 5, characterized by the fact that the wires or cables of the correction block are arranged contiguous to each other.

11. The tire according to claim 2 or claim 5, characterized by the fact that the cables of the correction block are steel wires, have a cable lay of between 12 and 20 times the apparent diameter of the cable, and have a relative elongation less than 0.2% under a load equal to 10% of the rupture load of the cable.

12. The tire according to claim 2 or claim 5, characterized by the fact that one of the plies of the correction block is narrower than the other ply, the difference in width being at most equal to 10% of the widest ply.

13. The tire according to claim 5, characterized by the fact that the correction block is formed of a folded ply.

14. The tire according to claim 7, characterized by the fact that the width of the correction block is between 5% and 20% of the maximum axial width of the carcass reinforcement, and preferably between 8% and 15%.

15. The tire according to claim 8, characterized by the fact that the width of the correction block is between 5% and 80% of the maximum axial width of the carcass reinforcement and more particularly between 12% and 20% for a ratio H/B close to 1, between 24% and 40% for a ratio H/B close to 0.75, and between 45% and 80% for a ratio H/B close to 0.3, H being the radial height of the tire on its rim and B the maximum axial width of the tire.

16. The tire according to claim 1, characterized by the fact that the correction block is associated with a tread reinforcement which protrudes axially on a single side from the tread surface intended to come into contact with the ground and has a folded ply, the fold forming the edge opposite the protruding edge with respect to the equatorial plane of the tire.

* * * * *